United States Patent
Weinstein et al.

(10) Patent No.: US 11,422,799 B1
(45) Date of Patent: Aug. 23, 2022

(54) ORGANIZING SOFTWARE PACKAGES BASED ON IDENTIFICATION OF UNIQUE ATTRIBUTES

(71) Applicant: Synopsys, Inc., Mountain View, CA (US)

(72) Inventors: Damon A. Weinstein, Arlington, MA (US); Mayur Anil Kadu, Burlington, MA (US); Jay E. Ricco, Arlington, MA (US); Kathleen E. Corbett, Lowell, MA (US); Jagat Prakashchandra Parekh, Andover, MA (US); Sai Keerthy Kakarla, Burlington, MA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/125,069

(22) Filed: Dec. 17, 2020

Related U.S. Application Data

(60) Provisional application No. 62/951,826, filed on Dec. 20, 2019.

(51) Int. Cl.
*G06F 8/75* (2018.01)
*G06N 20/00* (2019.01)
*G06N 5/00* (2006.01)
*G06F 8/71* (2018.01)

(52) U.S. Cl.
CPC ............... *G06F 8/75* (2013.01); *G06F 8/71* (2013.01); *G06N 5/003* (2013.01); *G06N 20/00* (2019.01)

(58) Field of Classification Search
CPC .. G06F 8/75; G06F 8/71; G06N 20/00; G06N 5/003
USPC ........................................................ 717/121
See application file for complete search history.

(56) References Cited

U.S. PATENT DOCUMENTS

2010/0241469 A1* 9/2010 Weigert .............. G06F 11/3604
717/124

* cited by examiner

*Primary Examiner* — John Q Chavis
(74) *Attorney, Agent, or Firm* — Park, Vaughan, Fleming & Dowler LLP; Laxman Sahasrabuddhe

(57) ABSTRACT

A set of attributes of software packages may be determined by analyzing a first set of software packages, where the set of attributes of software packages may be useful for uniquely identifying software packages in the first set of software packages. A heuristic may be created or a machine learning model may be trained that combines the set of attributes of software packages to uniquely identify software packages in the first set of software packages. The heuristic or the trained machine learning model may be used to categorize a second set of software packages, or determine relationships among a second set of software packages.

15 Claims, 4 Drawing Sheets

ORGANIZING SOFTWARE PACKAGES BASED ON IDENTIFICATION OF UNIQUE ATTRIBUTES

RELATED APPLICATION

This application claims the benefit of U.S. Provisional Application Ser. No. 62/951,826, filed on 20 Dec. 2019, the contents of which are herein incorporated by reference in their entirety for all purposes.

TECHNICAL FIELD

The present disclosure relates to software packages. More specifically, the present disclosure relates to organizing software packages based on identification of unique attributes.

BACKGROUND

A large number of software packages have been created for use in a wide range of industries to leverage advances in computing power and storage capacity. Many software packages and the associated metadata exist in an unorganized state.

SUMMARY

Some embodiments described herein may determine a set of attributes of software packages by analyzing a first set of software packages, where the set of attributes of software packages are useful for uniquely identifying software packages in the first set of software packages. Next, the embodiments may create a heuristic or train a machine learning model that combines the set of attributes of software packages to uniquely identify software packages in the first set of software packages. The embodiments may then categorize a second set of software packages or determine relationships among the second set of software packages by using the heuristic or the trained machine learning model.

In some embodiments, the set of attributes of software packages may include a first set of attributes based on package manager metadata of the first set of software packages. Specifically, in some embodiments, the first set of attributes of software packages may be determined by: (1) tokenizing one or more components of package manager metadata of the first set of software packages to obtain a set of tokens, (2) determining a frequency of occurrence of each token in the set of tokens, and (3) selecting one or more tokens from the set of tokens as the first set of attributes based on their frequency of occurrences.

In some embodiments, the set of attributes of software packages may include a second set of attributes based on version and release metadata of the first set of software packages. Specifically, in some embodiments, the second set of attributes of software packages may be determined by: (1) extracting version and release date metadata of the first set of software packages to obtain a set of version and release date tuples, (2) determining a frequency of occurrence of each version and release date tuple in the set of version and release date tuples, and (3) selecting one or more version and release date tuples from the set of version and release date tuples as the second set of attributes based on their frequency of occurrences.

In some embodiments, the set of attributes of software packages may include a third set of attributes based on signatures computed using contents of the first set of software packages. Specifically, in some embodiments, the third set of attributes of software packages may be determined by: (1) computing signatures based on contents of the first set of software packages to obtain a set of signatures, (2) determining a frequency of occurrence of each signature in the set of signatures, and (3) selecting one or more signatures from the set of signatures as the third set of attributes based on their frequency of occurrences.

BRIEF DESCRIPTION OF THE FIGURES

The disclosure may be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1A:
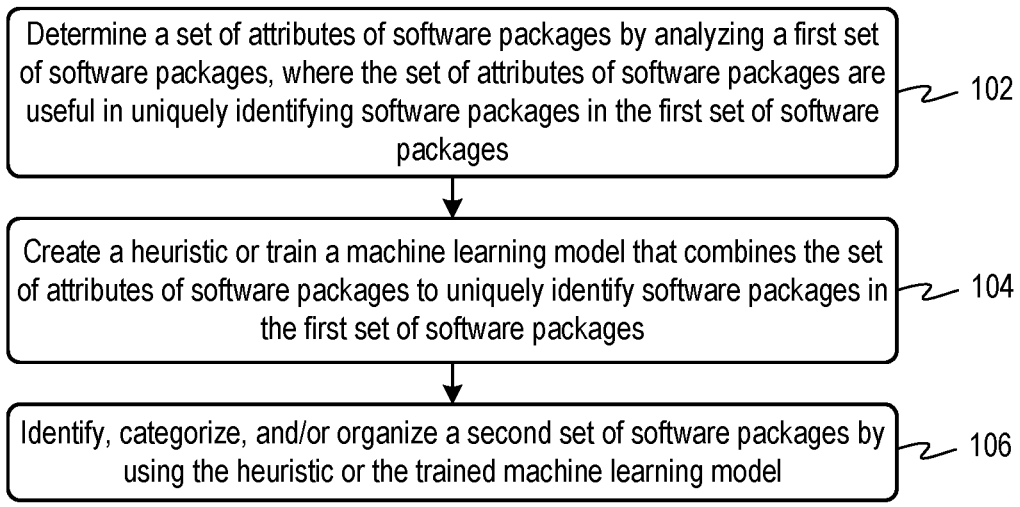
FIG. 1A illustrates a process for identifying, categorizing, and/or organizing software packages based on identification of unique attributes in accordance with some embodiments disclosed herein.

Aspects of the present disclosure relate to organizing software packages. In this disclosure, the term "software package" generally refers to a set of files which, when used in concert, implements a desired set of functionalities. The files in a software package may include, but is not limited to, source code files, library files, object code files, executable files, configuration files, and build automation files. The same file may be present in different software packages. For example, an object library that implements a secure communication protocol may be present in different software packages that use the secure communication protocol.

A software package may be stored using a package format, and may be managed by a package manager that understands the package format. In this disclosure, the term "package manager" refers to a software application (or a set of software applications) that may be used to perform various operations that include, but are not limited to, checking dependencies for installing a software package, installing the software package, upgrading the software package, configuring the software package, and/or uninstalling the software package. The package format may include a directory layout for the files in the software package, and may include metadata (name, version, checksum, etc.) related to the software package and/or one or more files in the software package.

A large number of software packages exist in private and public repositories across the world. However, most of these software packages exist as a collection of unstructured or unorganized set of software packages. Existing techniques for categorizing software packages are limited in their capabilities. Consequently, it is very challenging to measure security and compliance risk of software packages using existing categorization techniques.

Some embodiments described herein extract attributes from software packages that are useful in uniquely identifying the software packages. The embodiments then use a heuristic or a machine learning technique that combines the attributes to accurately and efficiently categorize and/or organize the set of software packages.

Advantages of embodiments described herein include, but are not limited to, (1) accurately and efficiently categorizing and/or organizing a set of software packages, which improves computer security by enabling the security and compliance risk of the software packages to be accurately measured, (2) accurately identifying unique vs. duplicate software package components, which can facilitate optimization of storage space requirements by deleting duplicate software package components, (3) identifying and categorizing inter-dependencies of software packages, and (4) improving computer security by reporting accurate vulnerability information for software packages at the sub-module level.

More than 75 million software packages are available in a myriad of internet repositories. The unstructured nature of these software packages poses the daunting challenge of identifying the underlying unique software components, which can allow customers to measure the security and compliance risk of using these software packages.

Accuracy and completeness are two important metrics that may be used to evaluate a software package categorization technique. Often, these two metrics are inversely correlated. A highly accurate technique generates few false positives, but the technique may not be able to categorize a large percentage of software packages, which means the technique may have a low level of completeness. On the other hand, a technique that has a high level of completeness (i.e., the technique is able to categorize a large percentage of software package) may be less accurate and generate more false positives. Embodiments described herein score highly on both the accuracy and the completeness metric by accurately categorizing a large percentage of software packages.

FIG. 1A illustrates a process for identifying, categorizing, and/or organizing software packages based on identification of unique attributes in accordance with some embodiments disclosed herein. The process may begin by determining a set of attributes of software packages by analyzing a first set of software packages, where the set of attributes of software packages are useful for uniquely identifying software packages in the first set of software packages (at 102). Next, the process may create a heuristic or train a machine learning model that combines the set of attributes of software packages to uniquely identify software packages in the first set of software packages (at 104). The process may then identify, categorize, and/or organize a second set of software packages by using the heuristic or the trained machine learning model (at 106). Organizing the second set of software packages may include determining relationships among the second set of software packages. The type of relationships that are determined may include, but are not limited to, (1) dependencies (one software package depends on another), (2) parent-child (a parent software package contains a child software package), and (3) sibling software packages (two distinct software packages are contained within the same parent software package).

Figure 1B:
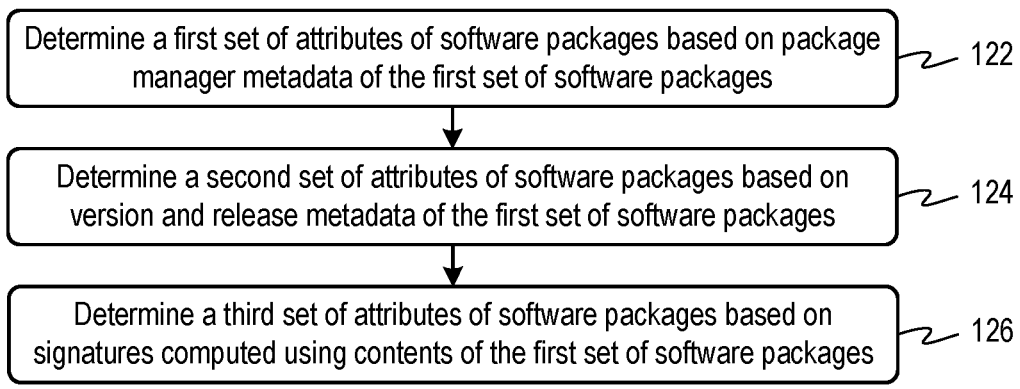
FIG. 1B illustrates a process for determining a set of attributes of software packages in accordance with some embodiments disclosed herein.

FIG. 1B illustrates a process for determining a set of attributes of software packages in accordance with some embodiments disclosed herein. The process may begin by determining a first set of attributes of software packages based on package manager metadata of the first set of software packages (at 122). Package manager metadata may generally include any information about a software package that is specific to, and used by, a package manager. Examples of package manager metadata include, but are not limited to, a name of the software package, a description of the software package, a checksum of the software package, a name of a vendor or software developer, a version number, a release date, and/or dependency information (e.g., a list of other software packages that are required for running the current software package). Next, the process may determine a second set of attributes of software packages based on version and release metadata of the first set of software packages (at 124). The process may then determine a third set of attributes of the software packages based on signatures computed using contents of the first set of software packages (at 126).

Specifically, in some embodiments, the frequency of attributes over the set of software packages may be used to select attributes that are useful for uniquely identifying software packages. Specifically, attributes that occur with a frequency that is less than a threshold frequency may be selected. The threshold may be fixed, or dynamically determined based on the set of software packages. For example, a frequency threshold that is too high may cause too many attributes to be selected, which may reduce the accuracy of the technique. On the other hand, a frequency threshold that is too low may cause too few attributes to be selected, which may reduce the completeness of the technique. In some embodiments, an iterative process may be used to dynamically determine frequency thresholds for attributes (different attributes may have different frequency thresholds) to meet the desired accuracy and completeness targets.

Figure 1C:
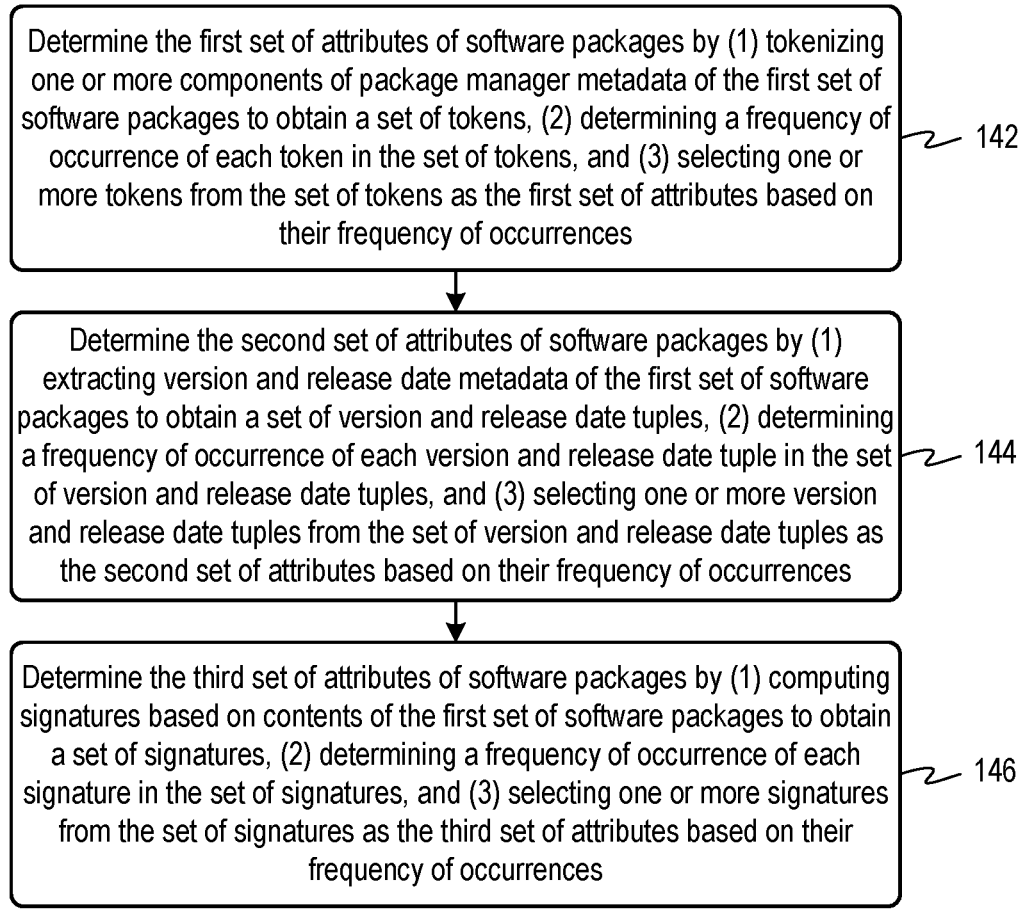
FIG. 1C illustrates a process for determining a set of attributes of software packages based on attribute frequencies in accordance with some embodiments disclosed herein.

FIG. 1C illustrates a process for determining a set of attributes of software packages based on attribute frequencies in accordance with some embodiments disclosed herein. The process may begin by determining the first set of attributes by (1) tokenizing one or more components of package manager metadata of the first set of software packages to obtain a set of tokens, (2) determining a frequency of occurrence of each token in the set of tokens, and (3) selecting one or more tokens from the set of tokens as the first set of attributes based on their frequency of occurrences (at 142). During tokenization, input data is broken into lexical units based on a set of rules (e.g., a set of regular expressions). The term "token" may refer to a lexical unit. For example, if the input data is a package name in the format "<string1>.<string2>.<string3>," then after tokenization, the tokens may refer to the embedded strings, namely "string1," "string2," and "string3."

A software package that is distributed via a package manager may include metadata that contains an identifier or name that the package manager uses to refer to the software package. Specifically, a package manager may use the software package name to identify external dependencies. Differences between package manager naming conventions may be handled by tokenizing the software package name.

Figure 2A:
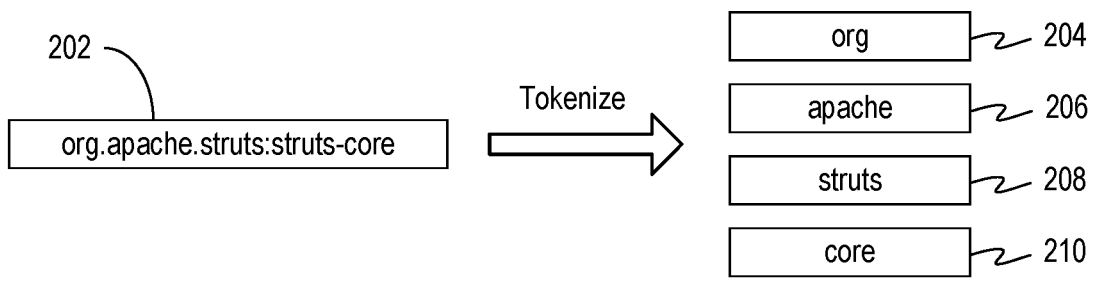
FIG. 2A illustrates an example of attributes of software packages that are based on package manager metadata in accordance with some embodiments disclosed herein.

FIG. 2A illustrates an example of attributes of software packages that are based on package manager metadata in accordance with some embodiments disclosed herein.

Software package name 202 includes strings that are separated by separator symbols such as ".", ":", and "-." During tokenization, software package name 202 may be parsed, and the individual strings embedded in software package name 202 may be extracted. For example, tokenizing software package name 202 may result in tokens 204, 206, 208, and 210 as shown in FIG. 2A.

Not all tokens may be equally valuable for uniquely identifying a software package. Thus, to better measure the value of a given token, the frequency or count of software packages in which the token appears may be used as a measure of uniqueness (and thus a measure of the token's value or usefulness in uniquely identifying the software package). Specifically, the more frequent the token is (or the higher the count of occurrence of the token in the set of software packages), the less valuable or useful the token is for uniquely identifying software packages.

Thus, in some embodiments, each software package name in the set of software package may be tokenized, and a frequency or count of the tokens may be determined over the set of software packages. Next, a threshold frequency or count may be used to filter the set of tokens. For example, suppose the set of software packages includes 100 software packages, and token T1 appears in 10 software package names, token T2 appears in 40 software package names, and token T3 appears in 80 software package names. If the threshold count for selecting a token is 20, then an embodiment may select token T1 for creating a heuristic (or for training a machine learning model), but may discard tokens T2 and T3 because their counts are greater than the threshold count. In other embodiments, instead of using an absolute threshold count, the embodiment may select a fixed number or a fixed percentage of tokens that have the lowest counts.

Next, referring to FIG. 1C, the process may determine the second set of attributes of software packages by (1) extracting version and release date metadata of the first set of software packages to obtain a set of version and release date tuples, (2) determining a frequency of occurrence of each version and release date tuple in the set of version and release date tuples, and (3) selecting one or more version and release date tuples from the set of version and release date tuples as the second set of attributes based on their frequency of occurrences (at 144).

Software packages typically include metadata that specifies the version and the release date. The version and the release date may be represented in various formats. In some embodiments, the version information and the release date information may be converted to a canonical format. For example, the version information may be converted to a semantic versioning format, and the release date information may be converted to a "YYYY-MM-DD" format. Next, the version and the release date may be combined to form an identifier or tuple. For example, the version may be combined with the release date by using a separator symbol, e.g., <major.minor.patch>:<yyyy.mm.dd>.

Figure 2B:
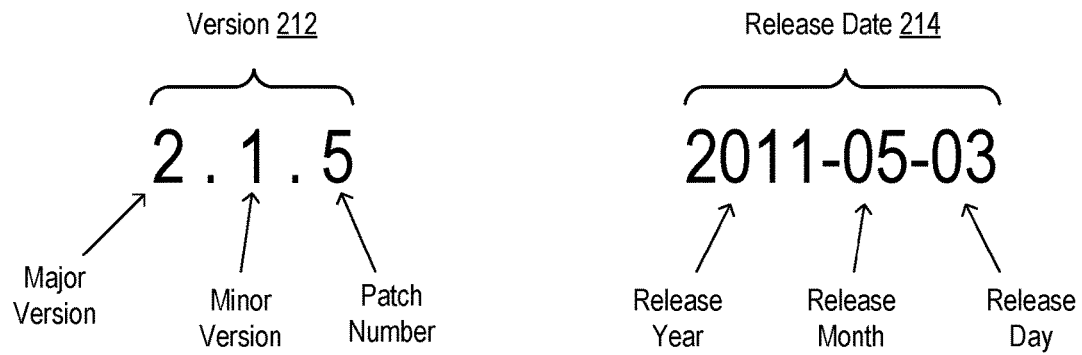
FIG. 2B illustrates an example of attributes of software packages that are based on version and release metadata in accordance with some embodiments disclosed herein.

FIG. 2B illustrates an example of attributes of software packages that are based on version and release metadata of the first set of software packages in accordance with some embodiments disclosed herein.

As an example, a first software package may be downloaded from Red Hat® having version 2.1.5 and release date May 3, 2011. Next, a second software package may be downloaded from Debian® having version 2.1.5 and release date May 3, 2011. The version and release date may be extracted from the metadata of these two software packages, and converted into a canonical format, e.g., version 212 and release date 214 as shown in FIG. 2B. Note that both of these software packages result in the same version and the release date tuple: <2.1.5>:<2011-05-03>.

In some embodiments, the version and the release date tuple may be extracted from each software package in a set of software packages, and a frequency or count of the tuples may be determined over the set of software packages. Next, a threshold frequency or count may be used to select certain tuples that are likely to be useful for uniquely identifying software packages. Specifically, the higher the frequency or count of the version and release date tuple, the less useful the tuple is for uniquely identifying software packages.

Next, referring to FIG. 1C, the process may determine the third set of attributes of software packages by (1) computing signatures based on contents of the first set of software packages to obtain a set of signatures, (2) determining a frequency of occurrence of each signature in the set of signatures, and (3) selecting one or more signatures from the set of signatures as the third set of attributes based on their frequency of occurrences (at 146).

Figure 2C:
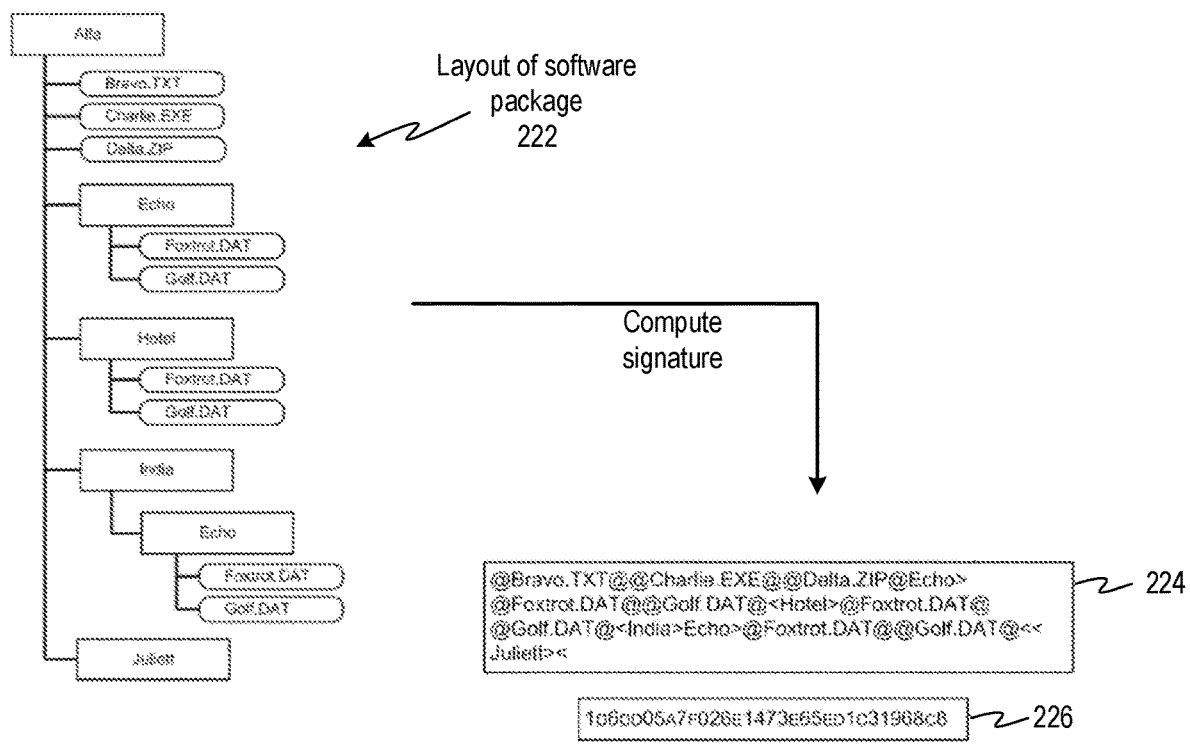
FIG. 2C illustrates an example of attributes of software packages that are based on signatures computed using contents of the software packages in accordance with some embodiments disclosed herein.

FIG. 2C illustrates an example of attributes of software packages that are based on signatures computed using contents of the software packages in accordance with some embodiments disclosed herein.

Layout of software package 222 may include the entire directory tree of the software package, or may include only a sub-tree of the software package. In some embodiments, the layout of software package 222 may be converted into a string, e.g., string 224 by flattening the directory tree. Next, a hash function may be used to compute a hash value (e.g., an MD5 digest) based on string 224, and the hash value may be used as the signature 226 corresponding to layout of software package 222.

Because a signature may represent the entire directory tree or a directory sub-tree, some embodiments may also compute a percent of the entire directory tree that is represented by the signature. This percentage value may also be used as an attribute for uniquely identifying software packages. For example, a first signature may represent the root of the software package layout, which means the signature corresponds to 100% of the software package layout, whereas another signature may only represent 5 files of a software package that includes 1000 files, thus representing 0.5% of the software package layout.

The percentage of the layout represented by a signature may be a useful indicator of uniqueness. Specifically, the higher the percentage, the better the signature may be at uniquely identifying software packages. For example, if two software packages have the same signature, and the signatures represent 100% of the software package, then there is a high probability that the two software packages are the same. Thus, in this example, the signature is very valuable or useful for uniquely identifying the software package. On the other hand, if two software packages have the same signature, and the signatures represent 0.5% of the software package, then this signature may not be valuable or useful for determining whether the two software packages are the same.

The examples of attributes presented above are for illustration purposes only and are not intended to limit the scope of this disclosure. Other examples of attributes include, but are not limited to, text in the software package metadata that describes the contents or the functionality implemented by the software package, universal resource locators (URLs) in the software package metadata, and URLs from where the software package was downloaded.

Specifically, downloads that are gathered using a web crawler may be downloaded from a specific download link or URL, which may be part of a broader software package for which a URL may also be gathered as the homepage or the project URL. In some embodiments, the homepage or project URL may be used as an attribute for determining if two downloads from different sources belong to a single unique software package, and whether homepage or project URL have any common content. For example, two Debian® downloads may share the full or partial project or homepage URL. In some embodiments, a percentage overlap may be computed between two URL, where a higher overlap percentage may indicate that the two software packages are the same software package.

Embodiments described herein may combine and filter the attributes in many ways to uniquely identify software packages. For example, some embodiments may bring together software packages which have at least one common package manager token, which occurs in under 100 software packages or at least three common tokens which occur in under 1000 software packages, and at least one signature at 100%, which occurs in under 100 software packages or at least five signatures at 67% in under 1000 software packages, and at least one version date combination.

In some embodiments, a heuristic may be an expression that uses logical and/or mathematical operators, and that is defined over the set of selected attributes and associated variables. For example, if the heuristic is a logical expression, then all software packages for which the heuristic evaluates to "TRUE" may be considered to be duplicate software packages. Consider the following heuristic example: ("strut" in PkgNameTokens) and (PkgVersion=="2.1.5"). In this heuristic, the variable "PkgNameTokens" may be a set of tokens that was generated by tokenizing the software package name, and the variable "PkgVersion" may store the version of the software package that was extracted from the package manager metadata. This logical expression evaluates to "TRUE" if, for a given software package, the set of tokens that were generated by tokenizing the software package name includes the string "strut" (which may be one of the attributes that was selected for creating the heuristic), and if the version of the software package is "2.1.5" (which may be another attribute that was selected for creating the heuristic). In this example, two software packages P1 and P2 may be considered to be the same software package if and only if the heuristic evaluates to "TRUE" for both of these software packages. As can be seen, there are a number of variations of the above-mentioned heuristic that can be used for identifying unique packages. These examples of heuristics are for illustration purposes only, and are not intended to limit the scope of this disclosure.

In some embodiments, a supervised machine learning model may be trained by using the attributes described above. Specifically, a neural network may be used, which may have an input layer of nodes, an output layer of nodes, and one or more hidden layers of nodes. In some embodiments, the attribute values of two software packages may be provided as input to the input layer of the neural network, and the output layer may output whether the two software packages are the same or not. In these embodiments, the input layer may include two sets of nodes, where each set of nodes corresponds to a particular software package, and the output layer may include a single output node that outputs a "0" value if the two software packages are different, and a "1" value if the two software packages are the same.

Training data may be collected for a set of software packages whose identities are known. Specifically, a set of attributes may be extracted for each software package. During training, the attribute values corresponding to two software packages may be provided as input, and the output may be set to a "0" or a "1" depending on whether the software packages are different or the same. A back propagation technique may be used to adjust connection weights in the neural network. After the neural network has been trained, the neural network may be used to determine whether two software packages are the same or different.

The heuristic or the neural network may be used to identify, categorize, and/or organize software packages. Specifically, all identical software packages may be tagged using the same unique identifier. If a sub-directory within a software package P1 matches the unique identifier of software package P2, then it may be inferred that software package P2 is contained within software package P1. If the package manager metadata of software package P1 indicates that software package P1 depends on software package P3, and if software package P4 is determined to be identical to software package P3, then a dependency relationship may be created between software package P1 and software package P4.

Figure 3:
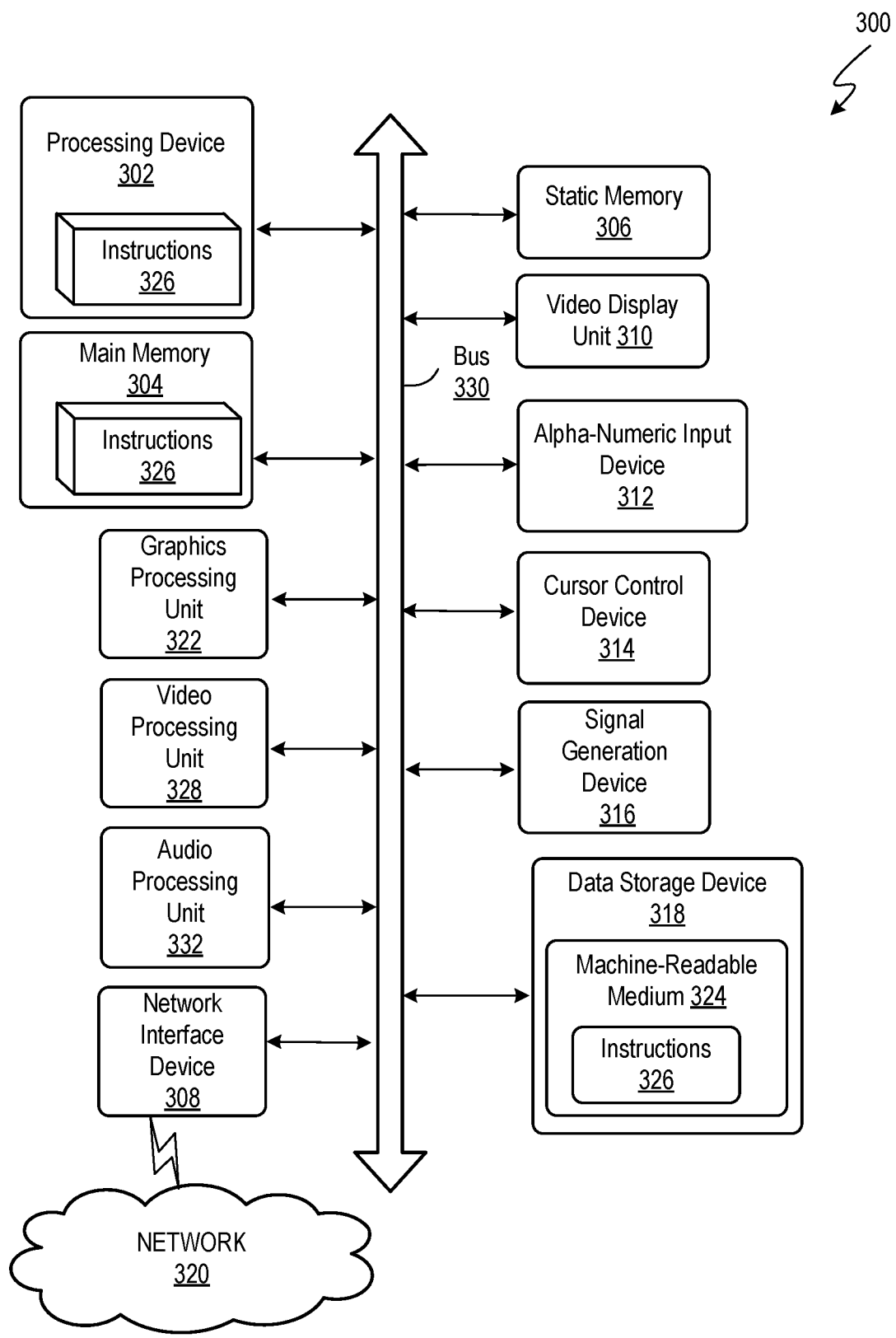
FIG. 3 illustrates an example machine of a computer system within which a set of instructions, for causing the machine to perform any one or more of the processes discussed herein, may be executed.

FIG. 3 illustrates an example machine of a computer system 300 within which a set of instructions, for causing the machine to perform any one or more of the processes discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM), a static memory 306 (e.g., flash memory, static random access memory (SRAM), etc.), and a data storage device 318, which communicate with each other via a bus 330.

Processing device 302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 may be configured to execute instructions 326 for performing the operations and steps described herein.

The computer system 300 may further include a network interface device 308 to communicate over the network 320. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), a graphics processing unit 322, a signal generation device 316 (e.g., a speaker), graphics processing unit 322, video processing unit 328, and audio processing unit 332.

The data storage device 318 may include a machine-readable storage medium 324 (also known as a non-transitory computer-readable medium) on which is stored one or more sets of instructions 326 or software embodying any one or more of the methodologies or functions described herein. The instructions 326 may also reside, completely or at least partially, within the main memory 304 and/or within the processing device 302 during execution thereof by the computer system 300, the main memory 304 and the processing device 302 also constituting machine-readable storage media.

In some implementations, the instructions 326 include instructions to implement functionality corresponding to the present disclosure. While the machine-readable storage medium 324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    determining a set of attributes of software packages by analyzing a first set of software packages, wherein the set of attributes of software packages are useful for uniquely identifying software packages in the first set of software packages, wherein the set of attributes of software packages includes a first set of attributes based on package manager metadata of the first set of software packages, and wherein the first set of attributes is determined by:
        tokenizing one or more components of package manager metadata of the first set of software packages to obtain a set of tokens,
        determining a frequency of occurrence of each token in the set of tokens, and
        selecting one or more tokens from the set of tokens as the first set of attributes based on the frequency of occurrences of tokens;

creating, by a processing device, a heuristic that combines the set of attributes of software packages to uniquely identify software packages in the first set of software packages; and categorizing a second set of software packages by using the heuristic.

2. The method of claim 1, wherein the set of attributes of software packages includes a second set of attributes based on version and release metadata of the first set of software packages.

3. The method of claim 2, wherein the second set of attributes is determined by:

extracting version and release date metadata of the first set of software packages to obtain a set of version and release date tuples;

determining a frequency of occurrence of each version and release date tuple in the set of version and release date tuples; and selecting one or more version and release date tuples from the set of version and release date tuples as the second set of attributes based on the frequency of occurrences of version and release date tuples.

4. The method of claim 1, wherein the set of attributes of software packages includes a third set of attributes based on signatures computed using contents of the first set of software packages.

5. The method of claim 4, wherein the third set of attributes is determined by:

computing signatures based on contents of the first set of software packages to obtain a set of signatures;

determining a frequency of occurrence of each signature in the set of signatures; and selecting one or more signatures from the set of signatures as the third set of attributes based on the frequency of occurrences of signatures.

6. A system, comprising:

a memory storing instructions; and a processor, coupled with the memory and to execute the instructions, the instructions when executed cause the processor to:

determine a set of attributes of software packages by analyzing a first set of software packages, wherein the set of attributes of software packages are associated with identifying software packages in the first set of software packages, wherein the set of attributes of software packages includes a second set of attributes based on version and release metadata of the first set of software packages, and wherein the second set of attributes is determined by:

extracting version and release date metadata of the first set of softwate packages to obtain a set of version and release date tuples;

determining a frequency of occurrence of each version and release date tuple in the set of version and release date tuples; and selecting one or more version and release date tuples from the set of version and release date tuples as the second set of attributes based on the frequency of occurrences of version and release date tuples;

create a heuristic that combines the set of attributes of software packages to identify software packages in the first set of software packages; and determine relationships among a second set of software packages by using the heuristic.

7. The system of claim 6, wherein the set of attributes of software packages includes a first set of attributes based on package manager metadata of the first set of software packages.

8. The system of claim 7, wherein the first set of attributes is determined by:

tokenizing one or more components of package manager metadata of the first set of software packages to obtain a set of tokens;

determining a frequency of occurrence of each token in the set of tokens; and selecting one or more tokens from the set of tokens as the first set of attributes based on the frequency of occurrences of tokens.

9. The system of claim 6, wherein the set of attributes of software packages includes a third set of attributes based on signatures computed using contents of the first set of software packages.

10. The system of claim 9, wherein the third set of attributes is determined by:

computing signatures based on contents of the first set of software packages to obtain a set of signatures;

determining a frequency of occurrence of each signature in the set of signatures; and selecting one or more signatures from the set of signatures as the third set of attributes based on the frequency of occurrences of signatures.

11. A non-transitory computer-readable medium comprising stored instructions, which when executed by a processor, cause the processor to:

determine a set of attributes of software packages by analyzing a first set of software packages, wherein the set of attributes of software packages are useful for uniquely identifying software packages in the first set of software packages, wherein the set of attributes of software packages includes a third set of attributes based on signatures computed using contents of the first set of software packages, and wherein the third set of attributes is determined by:

computing signatures based on contents of the first set of software packages to obtain a set of signatures;

determining a frequency of occurrence of each signature in the set of signatures; and selecting one or more signatures from the set of signatures as the third set of attributes based on the frequency of occurrences of tokens;

train a machine learning model that combines the set of attributes of software packages to uniquely identify software packages in the first set of software packages; and categorize a second set of software packages by using the machine learning model.

12. The non-transitory computer-readable medium of claim 11, wherein the set of attributes of software packages includes a first set of attributes based on package manager metadata of the first set of software packages.

13. The non-transitory computer-readable medium of claim 12, wherein the first set of attributes is determined by:

tokenizing one or more components of package manager metadata of the first set of software packages to obtain a set of tokens;

determining a frequency of occurrence of each token in the set of tokens; and selecting one or more tokens from the set of tokens as the first set of attributes based on the frequency of occurrences of tokens.

14. The non-transitory computer-readable medium of claim 11, wherein the set of attributes of software packages includes a second set of attributes based on version and release metadata of the first set of software packages.

15. The non-transitory computer-readable medium of claim 14, wherein the second set of attributes is determined by:
- extracting version and release date metadata of the first set of software packages to obtain a set of version and release date tuples;
- determining a frequency of occurrence of each version and release date tuple in the set of version and release date tuples; and
- selecting one or more version and release date tuples from the set of version and release date tuples as the second set of attributes based on the frequency of occurrences of version and release date tuples.

\* \* \* \* \*

UNITED STATES PATENT AND TRADEMARK OFFICE
CERTIFICATE OF CORRECTION

| | |
|---|---|
| PATENT NO. | : 11,422,799 B1 |
| APPLICATION NO. | : 17/125069 |
| DATED | : August 23, 2022 |
| INVENTOR(S) | : Damon A. Weinstein et al. |

Page 1 of 1

It is certified that error appears in the above-identified patent and that said Letters Patent is hereby corrected as shown below:

In the Claims

In Claim 6 (at Column 11, Line 54), please delete the word, "softwate" and replace with the word --software--.

In Claim 11 (at Column 12, Line 47), please delete the word, "tokens" and replace with the word --signatures--.

Signed and Sealed this
Eighth Day of November, 2022

Katherine Kelly Vidal
*Director of the United States Patent and Trademark Office*